(12) United States Patent
Fu et al.

(10) Patent No.: US 11,978,168 B2
(45) Date of Patent: May 7, 2024

(54) DISPLAY DEVICE FOR INDUSTRIAL MACHINE

(71) Applicant: FANUC CORPORATION, Yamanashi (JP)

(72) Inventors: Wanfeng Fu, Yamanashi (JP); Yuta Namiki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 76 days.

(21) Appl. No.: 17/996,586

(22) PCT Filed: Apr. 21, 2021

(86) PCT No.: PCT/JP2021/016207
§ 371 (c)(1),
(2) Date: Oct. 19, 2022

(87) PCT Pub. No.: WO2021/220915
PCT Pub. Date: Nov. 4, 2021

(65) Prior Publication Data
US 2023/0316668 A1    Oct. 5, 2023

(30) Foreign Application Priority Data

Apr. 27, 2020 (JP) .................. 2020-078214

(51) Int. Cl.
*G06T 19/00* (2011.01)
*G06F 3/14* (2006.01)
(52) U.S. Cl.
CPC .............. *G06T 19/006* (2013.01); *G06F 3/14* (2013.01)
(58) Field of Classification Search
CPC ................. G06T 19/006; G06F 3/14
See application file for complete search history.

(56) References Cited

U.S. PATENT DOCUMENTS

2004/0189675 A1* 9/2004 Pretlove ................ G06F 3/1454
348/E7.087
2016/0092131 A1* 3/2016 Nakajima ............. G06F 3/0604
711/111
(Continued)

FOREIGN PATENT DOCUMENTS

JP       2012-521855 A     9/2012
JP       2016-107379 A     6/2016
(Continued)

OTHER PUBLICATIONS

International Search Report issued in PCT/JP2021/016207; dated Jul. 6, 2021.

*Primary Examiner* — Terrell M Robinson
(74) *Attorney, Agent, or Firm* — Studebaker & Brackett PC

(57) ABSTRACT

Provided is a display device for an industrial machine capable of automatically switching between augmented reality display and 3D computer graphics display. A robot display device 2 comprises: a camera 2b; a display unit 20 capable of switching between a first display by means of 3D computer graphics for a robot 3 or for the robot 3 and peripherals 4 thereof, and a second display using augmented reality for the robot 3 and the peripherals 4 thereof captured by the camera 2b; and a selection unit 21 that activates the first display and displays the first display on the display unit when the camera 2b does not face the robot and the peripherals 4 thereof, and activates the second display and displays the second display on the display unit 20 when the camera 2b faces the robot 3 and the peripherals 4 thereof.

2 Claims, 4 Drawing Sheets

(56) References Cited

U.S. PATENT DOCUMENTS

| | | | |
|---|---|---|---|
| 2017/0203438 A1* | 7/2017 | Guerin | B25J 9/1605 |
| 2018/0355814 A1* | 12/2018 | Magner | F02D 41/221 |
| 2019/0012838 A1* | 1/2019 | Uchida | G06T 7/73 |
| 2019/0160671 A1* | 5/2019 | Kurihara | B25J 13/06 |
| 2021/0023694 A1* | 1/2021 | Chen | B25J 9/0081 |
| 2021/0181507 A1* | 6/2021 | Glaser | G02B 27/0172 |

FOREIGN PATENT DOCUMENTS

| | | |
|---|---|---|
| JP | 2016-197393 A | 11/2016 |
| JP | 2017-094466 A | 6/2017 |
| JP | 2017-100205 A | 6/2017 |
| WO | 2011/080882 A1 | 7/2011 |

* cited by examiner

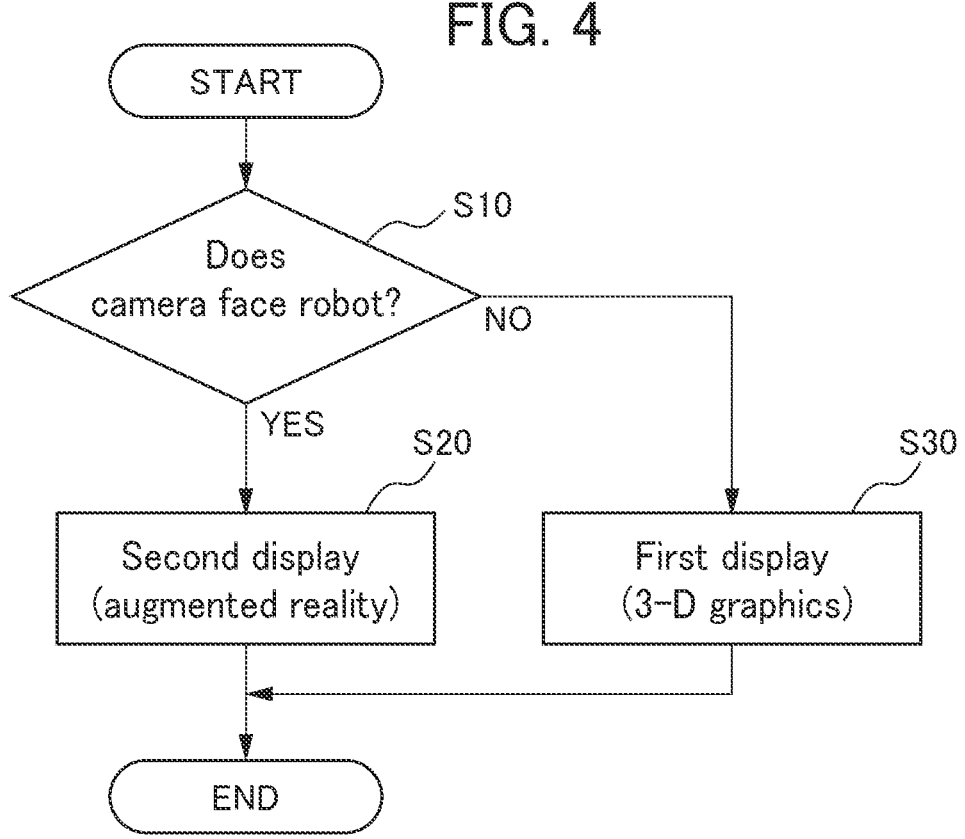

DISPLAY DEVICE FOR INDUSTRIAL MACHINE

TECHNICAL FIELD

The present disclosure relates to a display device for an industrial machine.

BACKGROUND ART

An industrial machine and peripheral equipment thereof can be displayed on a screen as virtual three-dimensional computer graphics, and various information of the industrial machine, for example, a teaching point of a program, a tool center point (TCP) locus, and a coordinate system can also be displayed.

Since such display as three-dimensional computer graphics is virtual, the display must be compared with the actual industrial machine and peripheral equipment, and it may be difficult to intuitively understand the display.

On the other hand, when a display device such as a tablet including a camera is used to display various information on an image of an actual robot and peripheral equipment using augmented reality (AR), intuitive understanding becomes possible (for example, see Patent Document 1).

Patent Document 1: Japanese Unexamined Patent Application, Publication No. 2016-107379

DISCLOSURE OF THE INVENTION

Problems to be Solved by the Invention

However, when the camera does not face an industrial machine such as a robot and peripheral equipment thereof, the industrial machine and peripheral equipment are not displayed and the use of the display device is not meaningless. In such a case, it is desirable to display the virtual three-dimensional computer graphics described above, but it is cumbersome to manually switch between the augmented reality display and the three-dimensional computer graphics display.

In response to the above issue, the present disclosure provides a display device for an industrial machine capable of automatically switching between augmented reality display and three-dimensional computer graphics display.

Means for Solving the Problems

An aspect of the present disclosure provides a display device for an industrial machine. The display device includes a camera, a display unit, and a selection unit. The display unit is configured to display, in a switchable manner, a first display using three-dimensional computer graphics of an industrial machine or the industrial machine and peripheral equipment thereof and a second display using augmented reality of the industrial machine and the peripheral equipment photographed by the camera. The selection unit is configured to activate the first display to display the first display on the display unit when the camera does not face the industrial machine and the peripheral equipment, and is configured to activate the second display to display the second display on the display unit when the camera faces the industrial machine and the peripheral equipment.

Effects of the Invention

According to an aspect of the present disclosure, it is possible to provide a display device for an industrial machine capable of automatically switching between augmented reality display and three-dimensional computer graphics display.

BRIEF DESCRIPTION OF THE DRAWINGS

FIG. 4 is a flowchart illustrating the operation of the robot display device according to the embodiment of the present disclosure.

PREFERRED MODE FOR CARRYING OUT THE INVENTION

A robot system 1 including a robot display device 2 according to an embodiment of the present disclosure will now be described with reference to the drawings.

Figure 1:
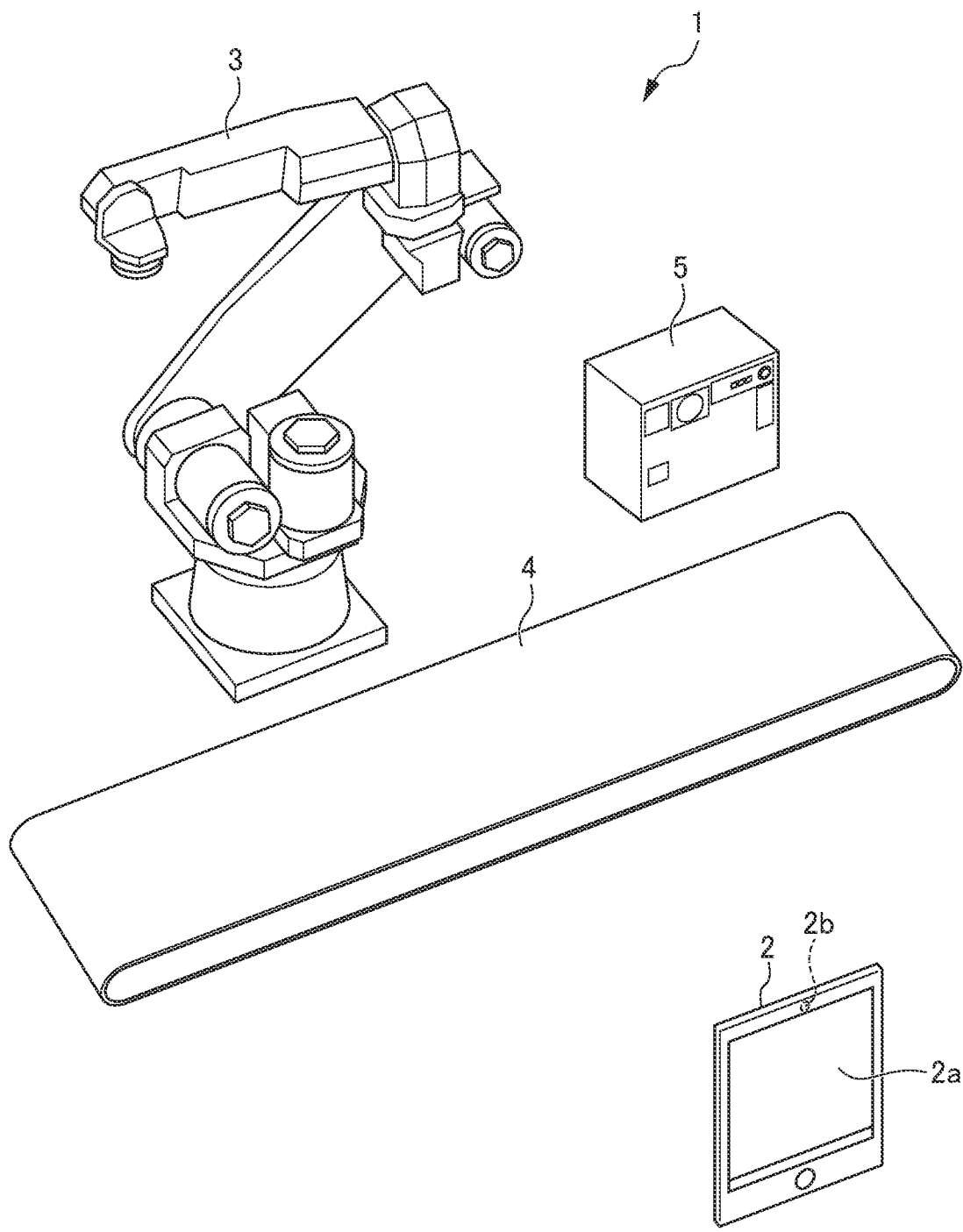
FIG. 1 is a schematic diagram of a robot system including a robot display device according to an embodiment of the present disclosure.
Figure 2:
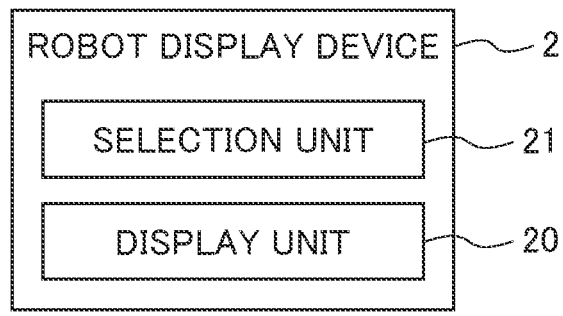
FIG. 2 is a functional block diagram of the robot display device according to the embodiment of the present disclosure.

First, the configuration of the robot system 1 including the robot display device 2 according to the present embodiment will be described with reference to FIGS. 1 and 2. FIG. 1 is a schematic diagram of the robot system 1 including the robot display device 2 according to the present embodiment. FIG. 2 is a functional block diagram of the robot display device 2 according to the present embodiment.

In the robot system 1 shown in FIGS. 1 and 2, a display unit 20 of the robot display device 2 displays a robot 3 and peripheral equipment 4 thereof on a display screen 2a. Specifically, the robot system 1 includes a robot display device 2, a robot 3, peripheral equipment 4, and a control device 5.

The robot display device 2 is a device in which the display device for an industrial machine of the present disclosure is applied to a display device for a robot. The robot display device 2 is a mobile communication terminal such as a tablet terminal. Specifically, the robot display device 2 includes a camera 2b, a display unit 20, an input unit (not shown) that allows input of information using the display unit 20 as a touch panel, communication means (not shown) that communicates with a control unit 5, arithmetic processing means (not shown) such as a central processing unit (CPU), and auxiliary storage means (not shown) such as a hard disk drive (HDD) or a solid state drive (SSD) that stores various programs, and main storage means (not shown) such as a random access memory (RAM) for storing data temporarily required for executing a program by the arithmetic processing means.

The display unit 20 displays, in a switchable manner, on the display screen 2a of the robot display device 2, a first display (see FIG. 3A) using the three-dimensional computer graphics of the robot 3 or the robot 3 and the peripheral equipment 4, and a second display (see FIG. 3B) using the augmented reality (AR) of the robot 3 and the peripheral equipment 4 photographed by the camera 2b.

Here, in augmented reality, augmented information such as a virtual three-dimensional object can be overlaid and displayed on an object in real space by extracting and aligning specific feature points such as markers of an image taken by a camera. In the present embodiment, markers can be attached to the robot 3 or the like, or an existing substance can be used as a marker. For example, the robot 3 itself can be used as a marker. Further, the alignment marker can be placed in the background, and is an object capable of providing a fixed point serving as a reference for a position or a scale. By imaging such an alignment marker with a camera, the position and orientation (posture) of the camera can be calculated, and augmented information of a virtual three-dimensional object or the like can be overlaid on an object in real space without any sense of incongruity.

When the display unit 20 displays the first display, the display unit 20 can display, for example, as information on the robot 3 and the peripheral equipment 4, at least one selected from a tool tip point of the robot 3, a teaching point of a program, a coordinate system of the robot 3, an operation range of each axis of the robot 3, a jog method of the robot 3, a locus of the robot 3, a position register, information of a sensor of the robot 3, and a reachable area of the robot 3.

Similarly, when the display unit 20 displays the second display, the display unit 20 can display, for example, as information on the robot 3 and the peripheral equipment, at least one selected from a tool tip point of the robot 3, a teaching point of a program, a coordinate system of the robot 3, an operation range of each axis of the robot 3, a jog method of the robot 3, a locus of the robot 3, a position register, information of a sensor of the robot 3, and a reachable area of the robot 3.

The information on the three-dimensional computer graphics of the robot 3 used for the first display is obtained from the control device 5 in advance and stored in the robot display device 2. The information on the three-dimensional computer graphics of the peripheral equipment 4 used for the first display is input in advance to the robot display device 2 by, for example, being obtained from the control device 5 and stored in the robot display device 2. The information of the feature points (markers, shapes) of the robot 3 and the peripheral equipment 4 used for the second display is input in advance to the robot display device 2 by, for example, being obtained from the control device 5 and stored in the robot display device 2. The information to be displayed together with the first display or the second display is obtained from the control device 5 in advance and stored in the robot display device 2.

As shown in FIG. 2, a CPU (not shown) included in the robot display device 2 implements various functions of the display unit 20, the selection unit 21, and the like by executing various programs.

When the camera 2b does not face the robot 3 and the peripheral equipment 4, the selection unit 21 activates the first display and causes the display unit 20 to display the first display on the display screen 2a. When the camera 2b faces the robot 3 and the peripheral equipment 4, the selection unit 21 activates the second display and causes the display unit 20 to display the second display on the display screen 2a. Whether the camera 2b faces the robot 3 and the peripheral equipment 4 is determined according to whether the robot 3 and the peripheral equipment 4 in real space are detected from an imaging result of the camera 2b.

Referring back to FIG. 1, the display unit 20 of the robot display device 2 displays the robot 3 and the peripheral equipment 4 on the display screen 2a. The robot 3 operates under the control of the control device 5. The peripheral equipment 4 is associated with the robot 3 and is, for example, a belt conveyor. The control device 5 controls the robot 3 and the peripheral equipment 4 and communicates with the robot display device 2.

Figure 3A:
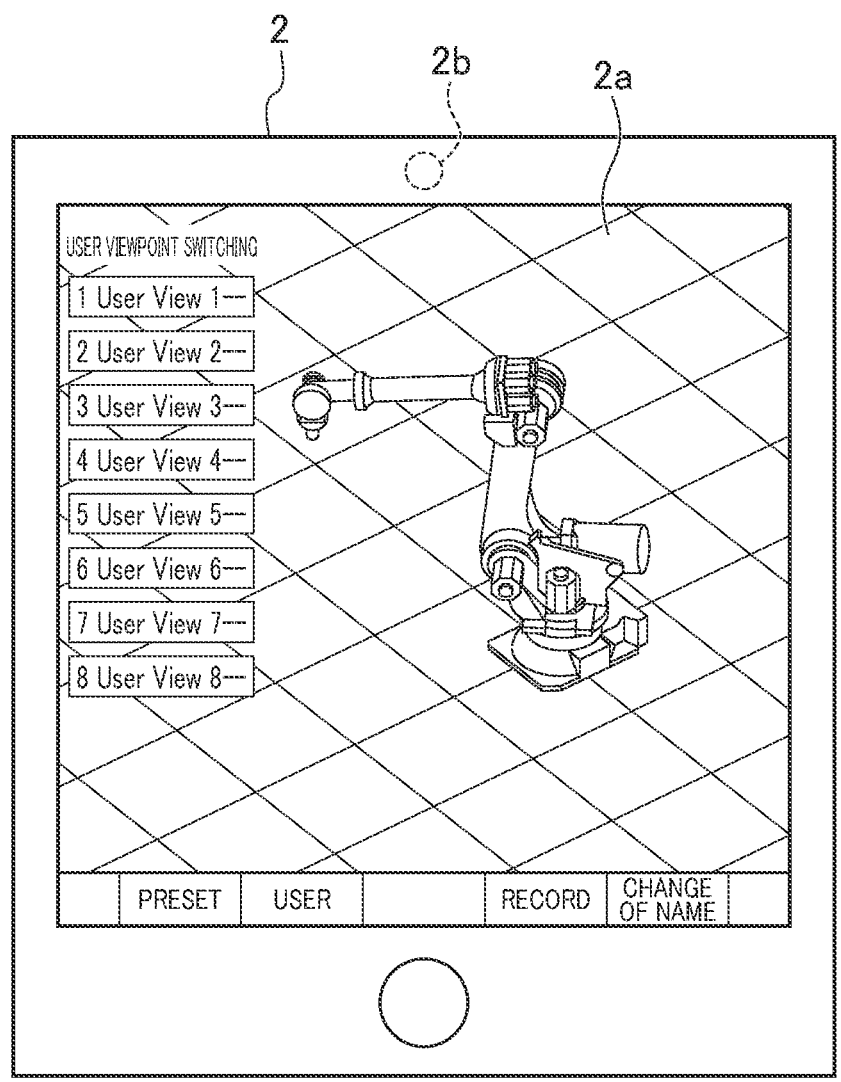
FIG. 3A is a schematic diagram of the robot display device according to the embodiment of the present disclosure with a first display displayed.

With reference to FIG. 3A, a case in which the robot display device 2 causes the display unit 20 to display the first display on the display screen 2a will be described FIG. 3A is a schematic diagram of the robot display device 2 according to the present embodiment with the first display displayed.

As shown in FIG. 3A, when the camera 2b does not face the robot 3 and the peripheral equipment 4, the selection unit 21 activates the first display using three-dimensional computer graphics and causes the display unit 20 to display the first display on the display screen 2a. At this time, as described above, the display unit 20 also displays at least one piece of information selected from a tool tip point of the robot 3, a teaching point of a program, a coordinate system of the robot 3, an operating range of each axis of the robot 3, a jog method of the robot 3, a locus of the robot 3, a position register, information of a sensor of the robot 3, and a reachable area of the robot 3.

Figure 3B:
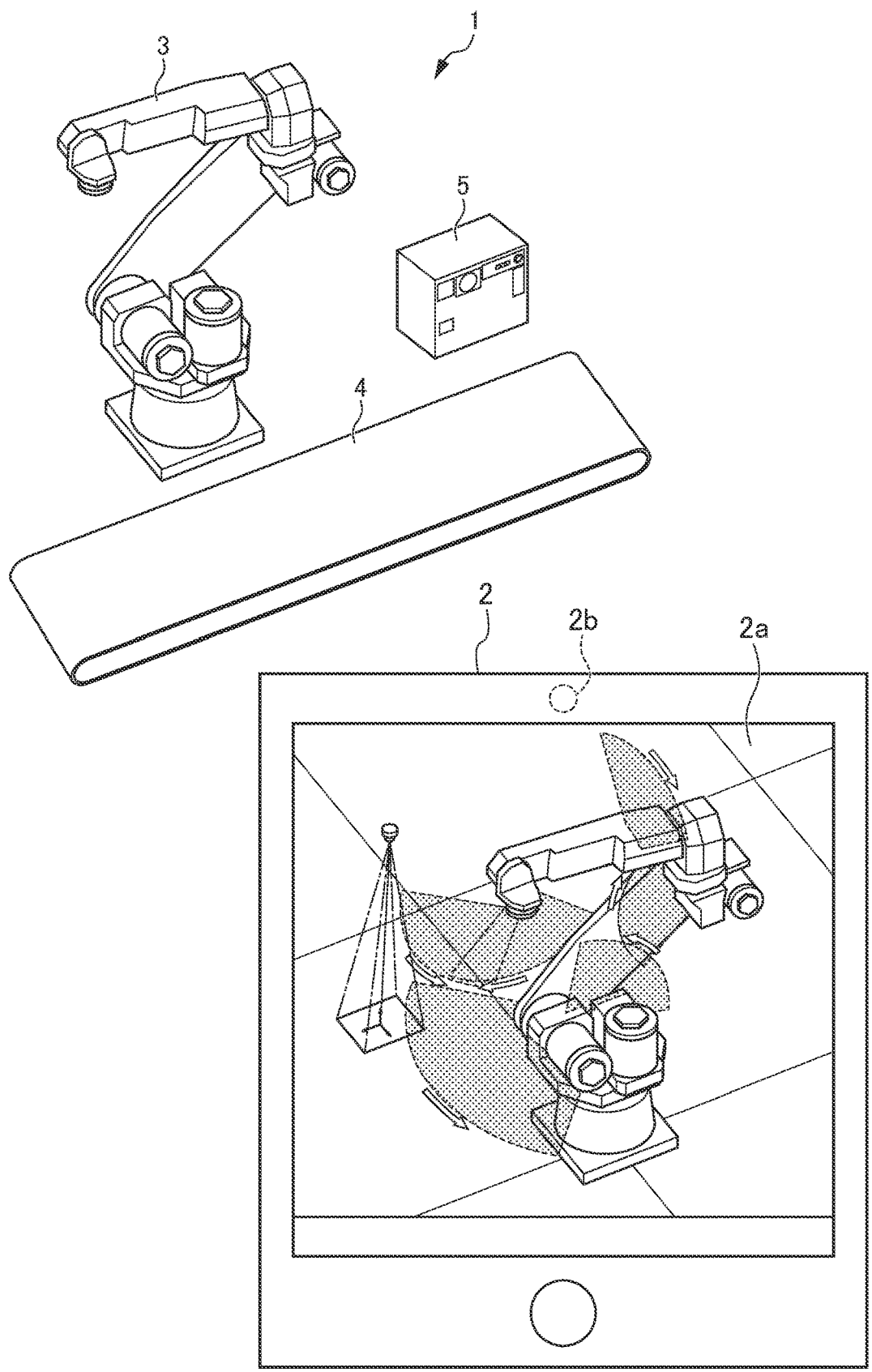
FIG. 3B is a schematic diagram of the robot display device according to the embodiment of the present disclosure with a second display displayed.

With reference to FIG. 3B, a case in which the robot display device 2 according to the present embodiment causes the display unit 20 to display the second display on the display screen 2a will be described. FIG. 3B is a schematic diagram of the robot display device 2 according to the present embodiment with the second display displayed.

As shown in FIG. 3B, when the camera 2b faces the robot 3 and the peripheral equipment 4, the selection unit 21 activates the second display using augmented reality and causes the display unit 20 to display the second display on the display screen 2a. At this time, as described above, the display unit 20 also displays at least one piece of information selected from a tool tip point of the robot 3, a teaching point of a program, a coordinate system of the robot 3, an operating range of each axis of the robot 3, a jog method of the robot 3, a locus of the robot 3, a position register, information of a sensor of the robot 3, and a reachable area of the robot 3. In the example shown in FIG. 3B, a user coordinate system and an operation range of each axis are displayed.

With reference to FIG. 4, the operation of the robot display device 2 according to the present embodiment will be described. FIG. 4 is a flowchart illustrating the operation of the robot display device 2.

As shown in FIG. 4, first, the selection unit 21 determines whether the camera 2b faces the robot 3 and the peripheral equipment 4 (Step S10).

When the camera 2b faces the robot 3 and the peripheral equipment 4 (when the determination in Step S10 is YES), the selection unit 21 activates the second display using augmented reality and causes the display unit 20 to display the second display on the display screen 2a (Step S20).

When the camera 2b does not face the robot 3 and the peripheral equipment 4 (when the determination in Step S10 is NO), the selection unit 21 activates the first display using virtual three-dimensional computer graphics and causes the display unit 20 to display the first display on the display screen 2a (Step S30). Thus, the present processing ends.

According to the present embodiment, the following effects are achieved. According to the robot display device 2 of the present embodiment, the display unit 20 is provided which displays the first display using the three-dimensional computer graphics of the robot 3 or the robot 3 and the peripheral equipment 4 and the second display using the augmented reality of the robot 3 and the peripheral equipment 4 photographed by the camera 2b in a switchable manner. The selection unit 21 is further provided which activates the first display when the camera 2b does not face the robot 3 and the peripheral equipment 4 and displays the first display on the display unit 20, and activates the second display when the camera 2b faces the robot 3 and the peripheral equipment 4 and displays the second display on the display unit 20.

Thus, when the camera 2b does not face the robot 3 and the peripheral equipment 4, the first display using the three-dimensional computer graphics of the robot 3 or the robot 3 and the peripheral equipment 4 can be displayed, and when the camera 2b faces the robot 3 and the peripheral equipment 4, the second display using the augmented reality of the robot 3 and the peripheral equipment 4 photographed by the camera 2b can be displayed. That is, it is possible to provide a robot display device capable of automatically switching between augmented reality display and three-dimensional computer graphics display.

Further, according to the robot display device 2 of the present embodiment, in the first display and the second display, at least one selected from a tool tip point of the robot 3, a teaching point of a program, a coordinate system of the robot 3, an operation range of each axis of the robot 3, a jog method of the robot 3, a locus of the robot 3, a position register, information of a sensor of the robot 3, and a reachable area of the robot 3 is displayed as information on the robot 3 and the peripheral equipment 4. This enables intuitive understanding and confirmation.

The present disclosure is not limited to the above embodiment, and various modifications and variations are possible. For example, in the above embodiment, the display device for an industrial machine of the present disclosure is applied to the robot display device 2, but the present disclosure is not limited thereto. The present invention can be applied to a display device for industrial machines such as various machine tools, in addition to the robot 3.

EXPLANATION OF REFERENCE NUMERALS

1 robot system
2 robot display device (display device for industrial machine)
2a display screen
3 robot (industrial machine)
4 peripheral equipment
5 control device
20 display unit
21 selection unit

The invention claimed is:

1. A display device for an industrial machine, comprising:
a camera;
a display unit configured to display, in a switchable manner, a first display using three-dimensional computer graphics of an industrial machine or the industrial machine and peripheral equipment thereof and a second display using augmented reality of the industrial machine and the peripheral equipment photographed by the camera; and
a selection unit configured to activate the first display to display the first display on the display unit when the camera does not face the industrial machine and the peripheral equipment, and configured to activate the second display to display the second display on the display unit when the camera faces the industrial machine and the peripheral equipment.

2. The display device according to claim 1, wherein the display unit displays, in the first display and the second display, as information on the industrial machine and the peripheral equipment, at least one selected from a tool tip point, a teaching point of a program, a coordinate system, an operation range of each axis, a jog method, a locus, a position register, information of a sensor of the industrial machine, and a reachable area of the industrial machine.

* * * * *